United States Patent Office 3,481,743
Patented Dec. 2, 1969

3,481,743
REMOVAL OF MIXED SOLVENTS CONTAINING WATER FROM DEFATTED OILSEED MARC BY USING A FOOD GRADE ALKALI UNDER DEHYDRATING CONDITIONS
William H. King, Metairie, La., assignor to the United States of America as represented by the Secretary of Agriculture
No Drawing. Original application May 17, 1966, Ser. No. 550,652. Divided and this application Sept. 9, 1968, Ser. No. 770,884
Int. Cl. A23j 1/14
U.S. Cl. 99—17
1 Claim

ABSTRACT OF THE DISCLOSURE

Aqueous-organic solvent mixtures are removed from a marc of protein-bearing comminuted oil seed meats by mixing with continuous agitation in a dehydrating atmosphere a select food alkali with the marc to obtain a pH of from about 7.0–9.0 thereby inhibiting agglutination.

---

A non-exclusive, irrevocable, royalty-free license in the invention described herein, throughout the world for all purposes of the United States Government, with the power to grant sublicenses for such purposes, is hereby granted to the Government of the United States of America.

This application is a divisional of copending application Ser. No. 550,652, filed May 17, 1966.

This invention relates to a process for removing polar and/or nonpolar volatile organic solvent mixtures, containing water, from an extracted marc such as that resulting from extraction of oil from protein-bearing comminuted oilseed meats with such a mixed solvent.

The main object of this invention is to provide a practical process for desolventizing aqueous-solvent-bearing proteinaceous material under conditions which avoid damage to the protein. Solvent-damp, extracted comminuted meats (marc) result from extraction of the raw flaked meats one or more times successively with either fresh solvent mixture, or, countercurrently with miscellas of progressively less oil content from previous extractions. Such countercurrent extractions are usually terminated with at least one wash with fresh solvent, resulting in a marc consisting essentially of particles of spent (defatted) meal to which essentially fresh solvent adheres.

A further object of the invention is to provide a means for removing water-containing mixed solvent from defatted, raw oilseed marc at relatively low temperatures to avoid heat damage to desirable native properties of the protein contained therein. When comminuted raw oilseed meats are brought into contact with mixed solvents containing volatile, nonpolar oil solvents such as pentane, hexane, heptane, benzene and the like, and volatile polar organic solvents such as acetone, the lower alcohols, such as methanol, ethanol, propanol, and the like, together with a small quantity of water (1 to 10%), such a mixture penetrates the hydrophilic as well as the lipophilic components of the natural oilseed meat structure and dissolves the fatty glycerides as well as soluble polar constituents of the crude lipids. Channels are thereby created in the meats structure, exposing a tremendous surface area for efficient contact between solvent and meats. This results in unusually high efficiency of extraction of the crude oil by the mixed solvent. However, in so doing, due to the greatly increased surface of contact between mixed solvent and the oil-bearing raw oilseed meats, a considerable portion of the resulting miscella is held up physically, resulting in a marc (after drainage of the miscella by gravity) which contains a greater weight of adhering residual solvent than solids (meal).

Ordinarily, in the commercial extraction of preconditioned (cooked or toasted) oilseed meats with commercial hexane, the residual solvent in the final marc is removed by distillation. When a wetting solvent (such as the type of mixed solvent dealt with in this invention) is used, due to the hydrophilic character of native oilseed protein, water is absorbed by the protein component from the solvent. When the mixed solvent is removed by distillation the more volatile organic solvents distil off first, leaving behind the moist vegetable protein mixture containing more water than was originally present, as natural moisture, in the meats. Natural oilseed proteins which are moist with water—about from 10% to 30% by weight—are difficult to dry by conventional means, particularly if the water content is sufficiently high to render the mixture plastic, viscous, or dough-like. If heat is applied to discrete particles of such mixtures "case-hardening" occurs which prevents migration of moisture to the surface of the particles so as to expose the moisture to a dehydrating atmosphere. The dehydrating atmosphere may be either continuously changing dry air at atmospheric or reduced pressure or reduced pressure alone. The optimum combination used is dependent on the desired maximum temperature of drying and the nature of the drying equipment used. Furthermore, warming discrete particles of oilseed protein-water mixtures may cause the mixture to become plastic and assume a continuous, homogeneous phase. When agitation is used, so as to continuously expose moist surfaces of the mixture to the dehydrating atmosphere, drying occurs; but a stage is reached, when the moisture content is reduced to the range—from about 10% to about 20% (depending on the character of the components of the mixture and the nature and magnitude of the applied mechanical forces) which requires exorbitant mechanical force to stir, tear, break, and/or cut the mixture so as to expose fresh, moist surfaces to the dehydrating atmosphere.

I have discovered that by adding a small amount of food acid or alkali, during or prior to the drying operation, to the moist proteinaceous material to give a pH of about from 7.0 to 9.0 when alkali is used and a pH of about from 4.0 to 5.5 when acid is used, either before or after removal of organic solvents by distillation, this tough, and extremely hard, brittle stage is avoided and comminution of the continuous phase of homogeneous plastic material occurs at moderate and practical expenditure of mechanical power—at the same time converting the mixture into a granular meal which is easy to handle and which can be further dried to any desired moisture content.

In carrying out the details of the present invention the solvent-damp marc is subjected to agitation with application of heat to supply heat of vaporization to the volatile components of the mixture, either at ambient or reduced pressure, depending on the maximum temperature desired, to remove the volatile organic solvent components with part of the water. The amount of water removed in this preliminary stage depends on the particular solvent combination used and whether or not an azeotropic mixture is formed which causes removal of at least part of the water with the organic solvents. This portion of the solvent mixture may be recovered in conventional equipment by condensation. A suitable proportion of food acid, such as orthophosphoric acid ($H_3PO_4$), or alkali such as sodium hydroxide (NaOH) is added during thorough mechanical agitation of the mixture (marc) either in the beginning of the drying operation before the organic solvent has distilled or at a later stage in the desolventization procedure. Other acidic or alkaline edible substances suitable for use in foods such as citric, tartaric, and lactic acids and calcium, potassium and lithium hydroxides, or their alkaline salts such as carbonate and phosphate may also be used. The chemical agent is added in such a way as to become quickly and intimately mixed with the marc. The addition of only small proportions of the agent (e.g., 0.5% to approximately 10% by weight of the proteinaceous material in the marc) is sufficient to have a pronounced effect on the physical properties and behaviour of the mixture during the agitative drying process. Agglutination of the protein is inhibited and the tough, plastic stage, which would otherwise develop and which would otherwise develop and which would require excessive power to comminute by physical action, is avoided.

This practical and convenient method of desolventizing marc obtained by extraction and/or treatment of oilseed meats with aqueous solvent mixtures can be carried out at either ambient pressure or under reduced pressure (vacuum), depending upon the maximum temperature desired in the interest of protecting the natural protein materials from heat damage. If desired, reduced pressure may be applied, after removal of the more volatile organic solvents, to lower the temperature necessary to distil off the remaining water which is to be removed.

The use of wholesome food acid or alkali not only does not impair the nutritive properties of the dried protein product but may actually increase the nutritive value by supplying mineral nutrients to food prepared therefrom. Furthermore, the physical properties of the protein particle so prepared are such as to increase the digestibility of the protein components by increased solubility and ease of disintegration and dissolution in an aqueous biological digestive system. The slight increase or decrease in acidity or basicity of the proteinaceous product of the process is minimized by the buffering action of the natural proteins of the mixture. No corrosion of conventional food processing machinery was evident during any of the experimental work leading to this invention.

The following examples are illustrative of the details of at least one method of practicing the invention, but should not be construed as limiting the invention in any manner whatever. The system acetone: hexane: water in the volume proportion 53:44:3 was utilized in Examples 1 through 6 only for the purpose of illustration.

EXAMPLE 1

Eight pounds of marc (derived from extraction of 4 lbs. of raw cottonseed meats with a mixture of acetone, hexane, and water in the volume proportion of 53:44:3) which contained 70% total volatile matter (TVM) by weight were added to the mixing chamber of a Baker-Perkins size 6-AN-2 Laboratory Mixer manufactured by Baker-Perkins, Inc., Saginaw, Mich. This equipment is a steam-jacketed steel mixer equipped with a vapor-tight, removable cover. It consists of a cubical mixing chamber with two rotating "sigma" blades which knead or mix the contents of the chamber, depending on the physical state of the charge. The bottom of the chamber contains two close-fitting rounded channels to provide minimum clearance for the rotating Z-shaped blades so as to insure complete mixing of the contents. These rotating blades are vacuum-sealed and are rotated by a 220 volt electric motor through a speed-reducing link-belt drive. The capacity of the mixing chamber is ½ cubic foot—part of which is occupied by the mixing blades. The steam jacket was preheated to a temperature of 350 degrees F. and maintained at this temperature throughout the drying operation. Rotation of the mixing blades was begun immediately and was continued until the dried material was discharged. The apparatus is equipped with a vacuum gauge and a thermometer well which extends into the material being dried and agitated. It can be tilted over on its side to discharge the dried material after the vacuum has been released and the cover removed. Vacuum was applied to the system from a steam aspirator line. An ammeter in series with the power line to the motor was used to measure current required to operate the stirring motor during the drying experiment.

The charge of marc was found by analysis to consist of 71% by weight of volatile matter and 29% of dry cottonseed meal with an oil content of 1.3%. The volatile matter consisted of 9% water, which included the natural moisture originally present in the raw meals, and 91% of acetone hexane mixture. The cover was placed on the apparatus and the vapor discharge valve was opened to allow the constant-boiling mixture of acetone, hexane, and water (53:44:3 volume percent) to discharge at atmospheric pressure. This phase of the desolventizing procedure was allowed to continue for 8 minutes. Temperature of the marc, which was being continually agitated and heated by the steam-jacketed walls of the chamber, remained at approximately 122 degrees F. The charge of partially desolventized marc remaining had a composition of 18% moisture, 5% acetone, and traces of hexane. This mixture had a plastic, doughy consistency which was continuously kneaded by the rotating mixer blades. Vacuum was then applied and the following temperature, time, pressure, and power requirement (in amperes at 220 volts A.C.) relationships were recorded (Table I).

TABLE I

| Time (minutes): | Pressure (Inches of Hg) | Temperature (Degrees F) | Power Required [1] (Amperes at 220 v.) |
| --- | --- | --- | --- |
| 0 | 2 | 90 | 0–4 |
| 1 | 7 | 93 | 4–4 |
| 2 | 7.5 | 95 | 4–6 |
| 3 | 7 | 97 | 4–8 |
| 4 | 7 | 97 | 4–9 |
| 5 | 6 | 98 | 1–11 |
| 6 | 7 | 99 | 1–12 |
| 7 | 8 | 100 | 0 |
| 8 | 9 | 100 | 0 |
| 10 | 10 | 120 | 0 |
| 12 | 10 | 123 | 0 |
| 16 | 11 | 130 | 0 |

(Discharged, lumpy to fine, dry powdery meal—7% moisture)

[1] In excess of current of 1 ampere required by motor when idling.

EXAMPLE 2

Another 8 lbs. batch of the marc of Example 1 was charged to the drying apparatus in the same manner and under the same physical conditions as under Example 1. After removal of the volatile acetone-hexane-water (AHW) mixture at atmospheric pressure, vacuum was applied and after 3 minutes the tough, partially dehydrated mass jammed the machine and stopped the motor. The continuous phase of hardened mass in the chamber had to be chipped away from the blades and walls of the mixing chamber.

EXAMPLE 3

Another 8 lb. batch of the marc of Example 1 was charged to the drying apparatus in the same manner and under the same physical conditions as under Examples 1 and 2. This time, however, immediately after putting the charge in the drying chamber 30 g. of NaOH (sodium hydroxide) dissolved in 100 ml. of water were added. The added chemical agent was immediately and thoroughly mixed with the solvent-damp marc. The pH of this mixture was 9.0. After 3 or 4 minutes during which the bulk of the volatile organic solvent mixture distilled off the solid marc crumbled into small discrete particles (meal). Stirring was continued at atmospheric pressure for 5 more minutes. No measurable power in addition to the 1 ampere required to rotate the motor and mixing blades under idling conditions was required during this period. Vacuum was then applied to the mixing chamber and the following time, pressure, temperature and power relationships were recorded (Table II).

TABLE II

| Time (minutes): | Pressure (Inches of Hg) | Temperature (Degrees F) | Power Required [1] (Amperes at 220 v.) |
|---|---|---|---|
| 1 | 8 | 98 | 0 |
| 2 | 10 | 115 | 0-1 |
| 3 | 11 | 126 | 0-2 |
| 4 | 11 | 130 | 0-3 |
| 5 | 11 | 135 | 0-2 |
| 6 | 12 | 136 | 0-1 |
| 8 | 14 | 135 | 0 |
| 10 | 16 | 137 | 0 |

(Discharged, granular meal, no odor of solvent moisture content 10%)

[1] In excess of current of 1 ampere required by motor when idling (no charge).

EXAMPLE 4

Another 8 lb. charge of the marc of Example 1 was charged to the drying chamber in the same manner and under the same physical conditions as in Examples 1, 2, and 3. This time, however, 25 ml. or 43 grams of syrupy phosphoric acid (85% orthophosphoric acid, sp. gr. 1.72) made up to 100 ml. with water were added immediately. The added chemical immediately became thoroughly mixed with the charge. The pH of this mixture was 5.0. After 6 minutes of stirring and heating, the vapor discharge valve was closed and vacuum was applied to the chamber. The granular mass was subjected to the pressure and temperature conditions for the times shown with the power requirements listed (Table III).

TABLE III

| Time (minutes): | Pressure (Inches of Hg) | Temperature (Degrees F) | Power Required [1] (Amperes at 220 v.) |
|---|---|---|---|
| 1 | 6 | — | 0 |
| 2 | 6 | 90 | 0 |
| 9 | 7 | 99 | 0 |
| 10 | 8 | 103 | 0-1 |
| 11 | 12 | 110 | 0-1 |
| 12 | 12 | 112 | 0-1 |
| 13 | 13 | 117 | 0-1 |
| 14 | 13 | 121 | 0-1 |
| 15 | 14 | 125 | 0-1 |
| 25 | 14-17 | 125-137 | 0-1 |

(Discharged, granular meal, no odor of solvent moisture content 10%)

[1] In excess of current of 1 ampere required by motor when idling (no charge).

EXAMPLE 5

Another 8 lb. charge of the same marc was treated in the same way as in Example 4. This time, however, instead of applying vacuum to the chamber after removal of the volatile organic solvents by vaporization, 2 pounds of meal previously dried as in Example 4 were fed back to the moist, plastic marc while stirring continued. In about 1 minute of stirring the mixture granulated and mixing was continued for 30 minutes while a gentle stream of air from an electric fan was passed over the agitating mixture. The dry meal was discharged as before and was found to contain 9% moisture with no odor of organic solvent.

EXAMPLE 6

Another 8 lb. charge of the same marc was treated the same way as in Example 3. This time, however, instead of applying vacuum to the chamber after removal of the volatile acetone and hexane components of the solvent by vaporization at atmospheric pressure, 2 pounds of meal previously treated and dried by the procedure of Example 3 were fed back to the agitating mixture while stirring continued. In about 2 minutes of stirring the mixture granulated and mixing was continued for 30 minutes while a gentle stream of air was passed over the agitating mixture. The dry meal was discharged and was found to contain 10% of moisture with no odor of organic solvent.

I claim:
1. A process for removing aqueous-organic solvent mixtures from a marc of protein-bearing comminuted oilseed meats whereby agglutination of the proteinaceous material is inhibited, comprising:
  (a) mixing the marc obtained by extraction of comminuted oilseed meats with an aqueous volatile organic solvent mixture with a sufficient amount of a food alkali to obtain a pH of from about 7.0–9.0, the said mixing being carried out with continuous agitation and application of heat to supply heat of vaporization to the volatile component of the mixture, and
  (b) desolventizing and concurrently dehydrating the mixture, with agitation, until all the volatile organic solvent is removed and the moisture content of the finished meal is about from 7% to 10%.

References Cited

UNITED STATES PATENTS

| 2,479,040 | 8/1949 | Davidson | 260—112 |
| 2,502,484 | 4/1950 | Saunders | 260—123.5 |
| 2,881,159 | 4/1959 | Circle et al. | 260—123.5 |

WILLIAM H. SHORT, Primary Examiner

H. SCHAIN, Assistant Examiner

U.S. Cl. X.R.

260—123.5